(12) United States Patent
Arora et al.

(10) Patent No.: US 6,401,195 B1
(45) Date of Patent: Jun. 4, 2002

(54) METHOD AND APPARATUS FOR REPLACING DATA IN AN OPERAND LATCH OF A PIPELINE STAGE IN A PROCESSOR DURING A STALL

(75) Inventors: Judge K. Arora, Cupertino; Harshvardhan P. Sharangpani, Santa Clara; Ghassan W. Khadder, San Jose, all of CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/223,232

(22) Filed: Dec. 30, 1998

(51) Int. Cl.⁷ ............................................. G06F 9/34
(52) U.S. Cl. ....................................... 712/218; 712/219
(58) Field of Search ................................. 712/218, 219

(56) References Cited

U.S. PATENT DOCUMENTS

| | | | | |
|---|---|---|---|---|
| 5,006,980 A | * | 4/1991 | Sanders et al. | 712/219 |
| 5,778,208 A | * | 7/1998 | Eickemeyer et al. | 712/203 |
| 5,778,248 A | * | 7/1998 | Leung | 712/218 |
| 5,996,065 A | * | 11/1999 | Makineni et al. | 712/218 |
| 6,038,658 A | * | 3/2000 | Chow | 712/219 |

\* cited by examiner

*Primary Examiner*—Richard L. Ellis
(74) *Attorney, Agent, or Firm*—David J. Kaplan

(57) ABSTRACT

In one method, a hazard on a register is detected based on the register ID from a latch of a first stage of a processor pipeline. The pipeline is stalled after a stale value of the register is stored in a latch of a later stage of the pipeline. The stale value in the latch is then replaced with a fresh value while the pipeline is stalled.

20 Claims, 3 Drawing Sheets

METHOD AND APPARATUS FOR REPLACING DATA IN AN OPERAND LATCH OF A PIPELINE STAGE IN A PROCESSOR DURING A STALL

FIELD OF THE INVENTION

The present invention relates to computer systems and more particularly to stalling a processor pipeline upon register hazard detection.

BACKGROUND OF THE INVENTION

Advanced processors employ pipelining techniques to execute instructions at very high speeds. On such processors, the overall machine is organized as multiple pipelines consisting of several cascaded stages of hardware. Instruction processing is divided into a sequence of operations, and each operation is performed by hardware in a corresponding pipeline stage ("pipe stage" or "stage"). Independent operations from several instructions may be processed simultaneously by different pipe stages, increasing the instruction throughput of the processor.

One challenge faced by processor designers is what to do when the execution of one instruction in a pipeline depends on the execution of one or more previously issued instructions. If data from a first instruction in a pipeline is needed by a second instruction in the pipeline, then the unavailability of the data from the first instruction causes a delay in the execution of the second instruction. In such a case, a portion of the pipeline may need to be halted, or stalled, until the first instruction completes execution so the resulting data can be used by the second instruction. This condition is called a hazard.

For example, consider the following set of instructions:

XOR R1, R2→R3
LOAD (R4)→R3
ADD R3, R5→R6

Proper calculation of result R6 requires that the operands of the ADD instruction, R3 and R5, be correct. For most processor architectures, this would require that R3 contain data resulting from execution of the LOAD instruction rather than execution of the XOR instruction. Unfortunately, the LOAD instruction may take longer to execute than the ADD instruction. Consequently, execution of the ADD instruction must be delayed by stalling the pipeline until the LOAD instruction is completed. This is known as a read after write (RAW) hazard because the ADD instruction must read register R3 after the LOAD instruction writes to register R3.

Hazard detection may be performed in parallel with the reading of the registers while an instruction is in the register read stage (also called the operand read stage) of the pipeline. Unfortunately, in high frequency processors, the hazard may not be detected until after the instruction has completed the register read stage and source data has been presented to the execute stage. For example, referring to the set of instructions presented above, upon detecting a hazard on register R3, the pipeline may be stalled after the ADD instruction has already been presented to the execute stage of the pipeline. Consequently, erroneous data is calculated for the ADD instruction using the result of the XOR instruction as the operand value for R3 rather than the result of the LOAD instruction. If this happens, the pipeline is typically flushed after the LOAD instruction is completed, and the instructions are re-executed beginning with the ADD instruction.

SUMMARY OF THE INVENTION

For one embodiment of the present invention, a hazard on a register is detected based on the register ID from a latch of a first stage of a processor pipeline. The pipeline is stalled after a stale value of the register is stored in a latch of a later stage of the pipeline. The stale value in the latch is then replaced with a fresh value while the pipeline is stalled.

Other features and advantages of the present invention will be apparent from the accompanying figures and the detailed description that follows.

BRIEF DESCRIPTION OF THE DRAWINGS

The present invention is illustrated by way of example and not limitation in the accompanying figures in which like references indicate similar elements and in which.

DETAILED DESCRIPTION

In accordance with an embodiment of the present invention, a RAW hazard is detected, and the stale (i.e. incorrect) operand data is allowed to be provided to the operand latch of an execute stage of a pipeline before the pipeline is stalled. Once stalled, the fresh (i.e. correct) operand data is bypassed to the operand latch of the execute stage before (or while) being written to the register file. The stale data in the operand latch is replaced with the fresh data, and the RAW hazard is nullified. At this time, the pipeline may be released from the stall. When execution continues on the instruction at the execute stage, the correct operand data is used to calculate a correct result. Therefore, there is no need to flush and re-execute instructions through the pipeline.

For example, consider, again, the following set of instructions:

XOR R1, R2→R3
LOAD (R4)→R3
ADD R3, R5→R6

When the ADD instruction is in the register read stage of the processor pipeline, the LOAD instruction is being executed in the execute stage of the pipeline. The values for operand registers R3 and R5 of the ADD instruction are read either from the register file or from a bypass network of the processor. Because the result for R3 from the XOR instruction is ready and the result from the LOAD instruction is not ready by the time the ADD instruction reaches the register read stage, the stale data for R3 (the result of R1 XOR R2) is read. This stale data is entered into the operand latch of the execute stage of the processor in the next clock cycle (when the ADD instruction enters the execute stage).

At this point, a register hazard detector, detecting the hazard on R3 between the LOAD and ADD instructions, asserts a stall signal, and the portion of the processor pipeline including the register read and execute stages is stalled. Once the LOAD instruction is completed, the fresh value for R3 is bypassed to the operand latch of the execute stage on its way to being written into the register file of the processor. When the pipeline is released from the stall, the correct, fresh value for R3 resides in the operand latch of the execute stage. The ADD instruction is then executed, calculating a correct result for R6 using the fresh value for R3 without having to re-read the register file.

A more detailed description of embodiments of the present invention, including various configurations and implementations, is provided below. As used herein, the term "stale" indicates a first value that is produced by an initial instruction of a set of instructions, and is intended to be overwritten by a second value produced by an intermediate instruction before a final instruction consumes the second value as an operand. The term "fresh" indicates the second value. Note that the terms "value" and "data" may be used interchangeably when referring to either an operand (including a register that is consumed by an instruction) or a result (including a register that is produced by an instruction).

Figure 1A:
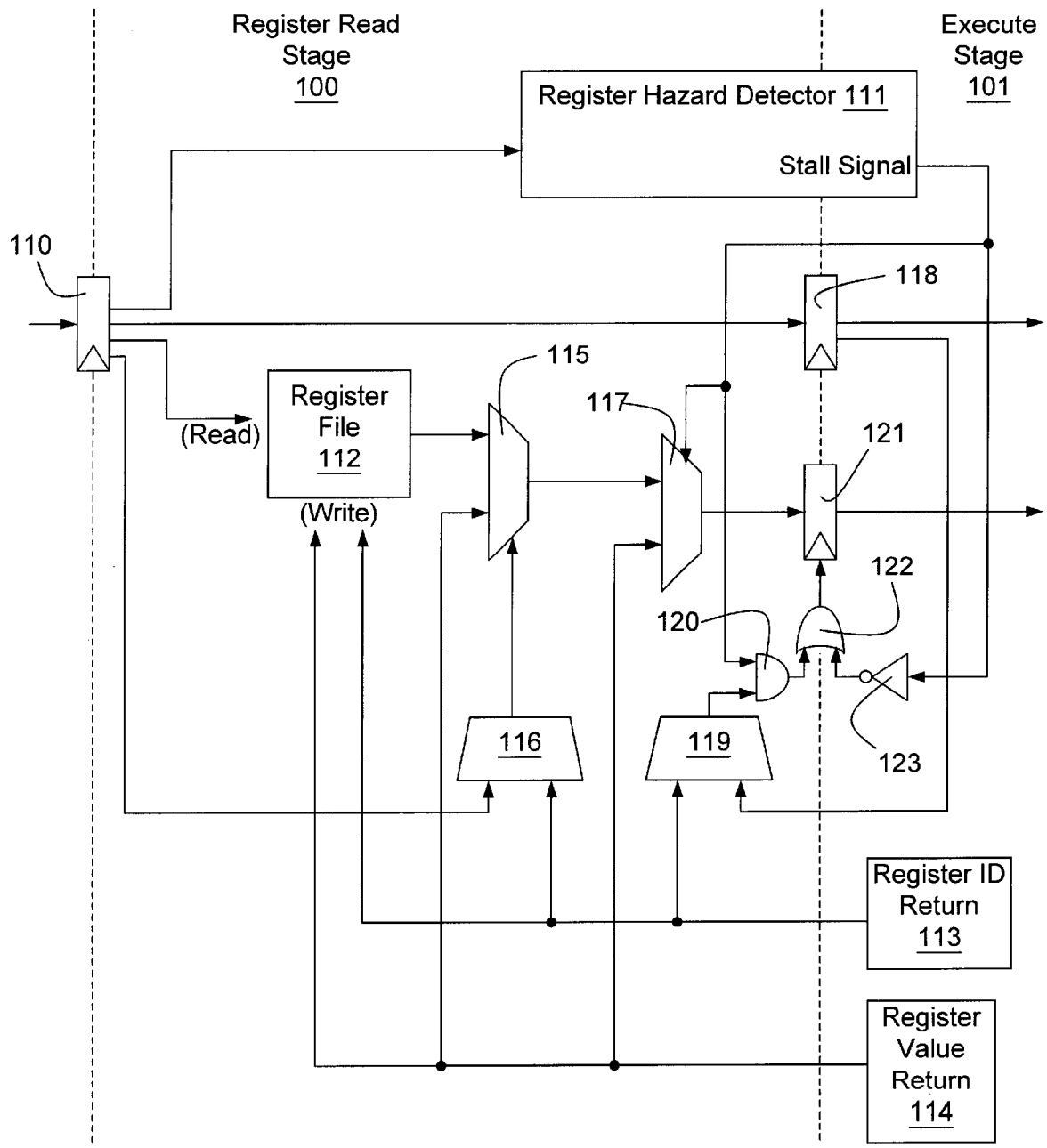
FIG. 1A is a circuit formed in accordance with an embodiment of the present invention.

FIG. 1A is a circuit formed in a portion of a processor pipeline in accordance with an embodiment of the present invention. Operand register ID latch 110 of register read stage 100 is coupled to an input of register hazard detector 111 and comparator 116. Latch 110 is also coupled to operand register ID latch 118 of execute stage 101, as well as to a read input of register file 112. An output of register file 112 is coupled to an input of multiplexer 115. Another input of multiplexer 115 is coupled to register value return 114 via a bypass network. Register value return 114 is also coupled, via the bypass network, to an input to multiplexer 117 as well as to a write input of register file 112. Register ID return 113 is coupled, via the bypass network, to comparators 116 and 119, as well as to another write input to register file 112. The output of comparator 116 is coupled to the control gate of multiplexer 115. The output of multiplexer 115 is coupled to an input of multiplexer 117, the output of which is coupled to operand latch 121 of execute stage 101. The output of comparator 119 is coupled to an input of AND gate 120. A stall signal output from register hazard detector 111 is coupled to a control gate of multiplexer 117 as well as to the other input to AND gate 120. The output of AND gate 120 is coupled to a first input of OR gate 122, and the stall signal output is coupled to a second input of OR gate 122 via inverter 123. The output of OR gate 122 is coupled to the enable input of operand latch 121.

To demonstrate the operation of the circuit of FIG. 1A, consider the execution of the sequence of instructions described above beginning with the ADD instruction in register read stage 100 of the pipeline. Latch 110 of register read stage 100 contains the register ID of register R3. This register ID is used to read the appropriate value associated with R3 from register file 112, and the value is provided to an input of multiplexer 115. The register value being returned from later pipeline stages (i.e. pipeline stages closer to the retirement stage), 114, via the bypass network of the processor, is provided to the other input to multiplexer 115. Register value return 114 along with register ID return 113 are provided to the write input of register 112 for updating the register file with the latest, freshest data.

Comparator 116 of FIG. 1A compares the register ID of R3 from latch 110 to the register ID value being returned from later pipeline stages, 113, via the bypass network. If there is a match, comparator 116 selects the lower input of multiplexer 115 to be output to multiplexer 117. If there is not a match, comparator 116 selects the upper input of multiplexer 115 to be output to multiplexer 117. According to the set of instructions provided above, the stale value of R3 from the XOR instruction is returned to the lower input of multiplexer 115, and this input is selected by comparator 116.

This stale value of R3 is provided to the upper input of multiplexer 117 of FIG. 1A, the control gate of which is coupled to the stall signal output of register hazard detector 111. The register ID for R3 is provided from latch 110 to an input of register hazard detector 111. Register hazard detector 111 then compares this consumer register ID with producer register IDs of prior instructions that have not completed execution (i.e. not been retired). In this manner, detector 111 detects the presence of any hazards on register R3, and if a hazard is detected, a stall signal is asserted.

According to the set of instructions described above, there is a hazard on R3 between the LOAD and ADD instructions. Note, however, that by the time detector 111 of FIG. 1A detects this hazard, and asserts the stall signal, a clock cycle has passed. While the ADD instruction is still in the register read stage, the stall signal is not yet asserted. As a result, the upper input to multiplexer 117 is selected as the output to operand latch 121 of execute stage 101. In addition, the unasserted stall signal is inverted through inverter 123, enabling latch 121 via OR gate 122. Once enabled, the timing of latch 121 may be controlled by the processor pipeline clock, permitting normal operation of the processor.

At the next clock cycle, the ADD instruction propagates ahead to execute stage 101 of FIG. 1A, and the register ID for R3 is provided to latch 118. The stale value for R3, resulting from the XOR instruction, is now stored in operand latch 121 of execute stage 101. This stale value may then be used in execute stage 101 to calculate an erroneous result of the ADD instruction. Any erroneous result, however, is not forwarded to a later pipeline stage because the stall signal from register hazard detector 111 is asserted while the ADD instruction is in the execute stage. This signal is asserted as a result of detector 111 detecting the hazard on R3 between the LOAD and ADD instructions.

Once the stall signal is asserted, the portion of the pipeline including register read stage 100 and execute stage 101 of FIG. 1A is stalled. The stall signal is inverted by inverter 123, disabling operand latch 121 via OR gate 122. In addition, the asserted stall signal, which is applied to the control gate of multiplexer 117, selects the lower input of the multiplexer. This lower input is coupled to the register value return 144 from later pipeline stages of the processor via the bypass network. The register ID for R3 from latch 118 of execute stage 101 is compared to register ID return 113 by comparator 119. When a match is found, the output of the comparator to AND gate 120, coupled with the asserted stall signal to the AND gate, causes the output of the AND gate to enable operand latch 121 via OR gate 122.

At this time, the lower input to multiplexer 117, which corresponds to the bypassed register value return 114 of the R3 value from the LOAD instruction, is provided to operand latch 121 of FIG. 1A. Consequently, the stale R3 value stored in operand latch 121, which is the result of the XOR instruction, is replaced with the fresh R3 result from the LOAD instruction. In addition, the fresh value for R3 is written into the proper location of register 112. In accordance with one embodiment of the present invention, writing the value of register R3 from the LOAD instruction into register file 112 may be done in parallel with the replacing of the stale R3 value with the fresh R3 value in operand latch 121.

This fresh value for R3 is now used as an operand in execute stage 101 of FIG. 1A to calculate a correct result of the ADD instruction. The stall signal is deasserted, and operation of the pipeline proceeds normally.

For an alternate embodiment of the present invention, the circuit of FIG. 1A may be modified by reusing comparators and multiplexing between register ID latches at the comparator input. This may be found useful to reduce the number of comparators in the circuit design, thereby decreasing circuit size. For example, one such embodiment is shown in FIG. 1B.

Figure 1B:
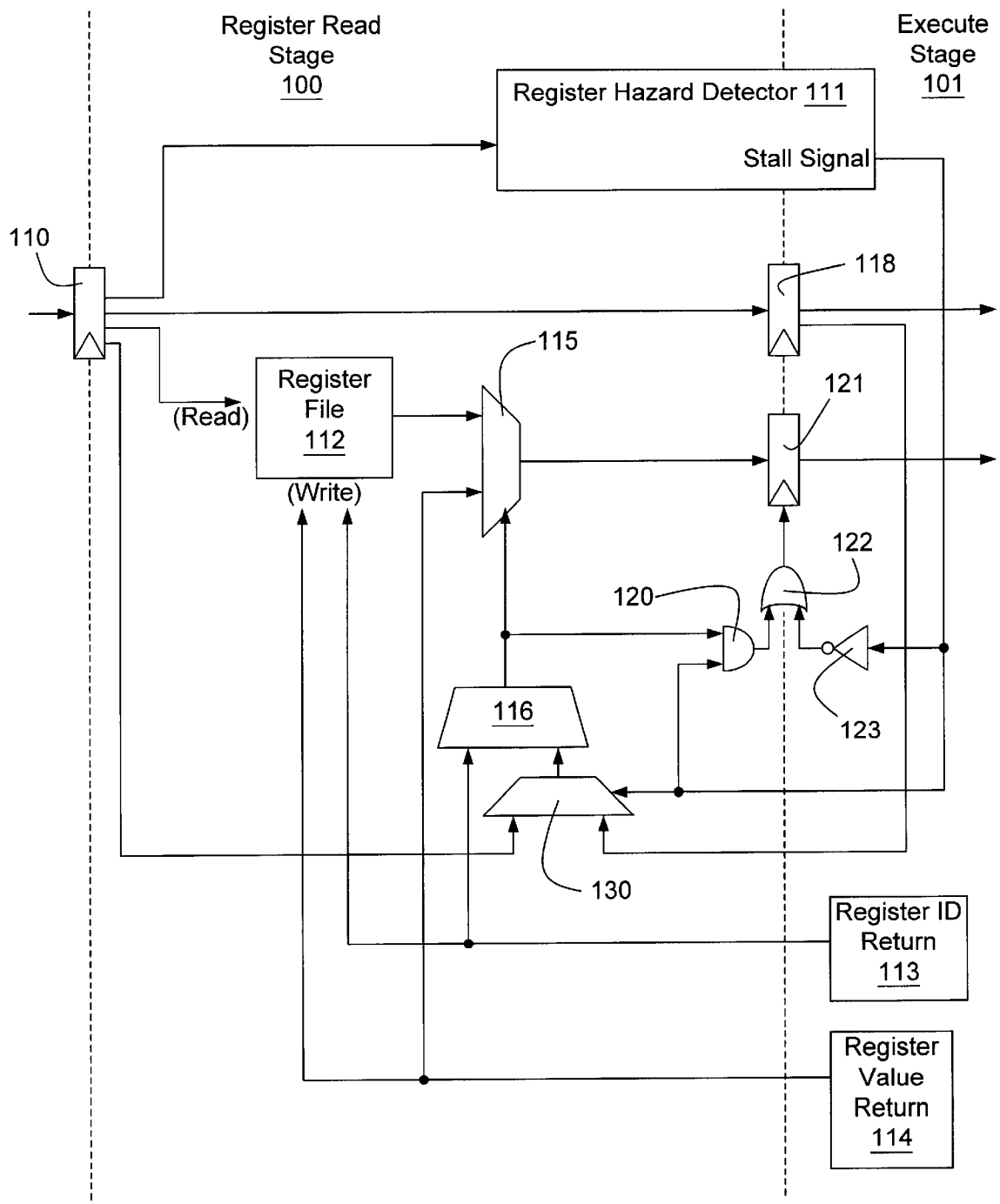
FIG. 1B is the circuit of FIG. 1A modified in accordance with an alternate embodiment of the present invention.

FIG. 1B is the circuit of FIG. 1A modified in accordance with an alternate embodiment of the present invention. FIG. 1B operates nearly identically to FIG. 1A. The design of FIG. 1B, however, is slightly enhanced by reusing comparator 116 to compare register ID return 113 to one of two register IDs depending on whether or not register hazard detector 111 detects a hazard and asserts a stall signal.

During normal operation, the stall signal from register hazard detector 111 is unasserted, thereby selecting the register ID from register ID latch 110 of register read stage 100 via multiplexer 130. This register ID is provided to an input of comparator 116, and is compared to register ID return 113 to detect a match. If a match is detected, the output of comparator 116 selects the lower input of multiplexer 115. This bypasses register value return 114 through to operand latch 121 of execute stage 101. If a match is not detected, the value from register file 112 is provided to operand latch 121.

During a stall due to a register hazard detection, the stall signal from register hazard detector 111 is asserted, thereby selecting the register ID from register ID latch 118 of execute stage 101 via multiplexer 130. This register ID is provided to an input of comparator 116, and is compared to register ID return 113 to detect a match. When a match is detected, the output of comparator 116 selects the lower input of multiplexer 115 and enables latch 121 (via AND gate 120 and OR gate 122, as described above). This bypasses register value return 114 through to operand latch 121 of execute stage 101, replacing the stale value in latch 121 with the fresh value.

Figure 2:
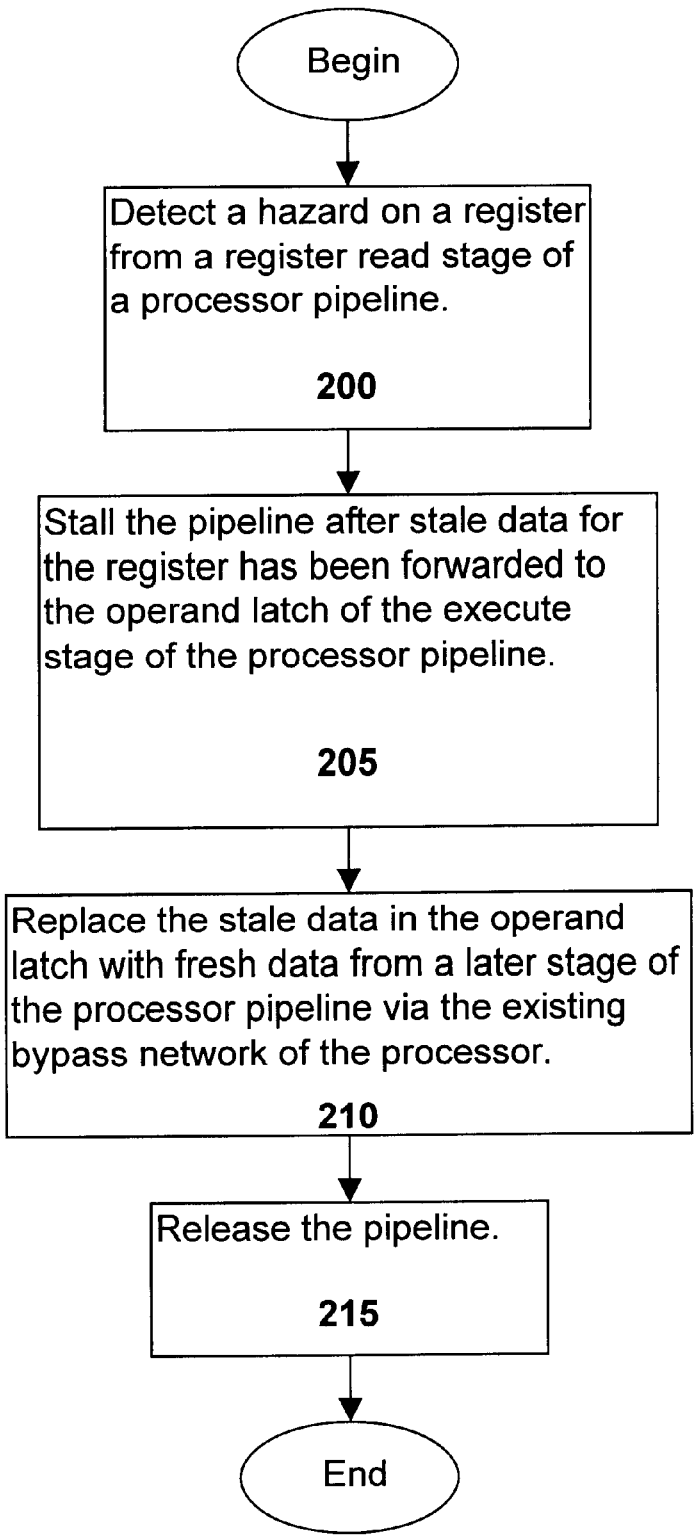
FIG. 2 is a flow chart showing a method of the present invention.

FIG. 2 is a flow chart showing a method of the present invention. At step 200, a hazard is detected on a register between two instructions. The hazard is detected using a register ID from a register ID latch of the register read stage of the processor pipeline. At step 205, the pipeline is stalled after stale data for the register has been provided to the operand latch of the execute stage of the processor pipeline.

At step 210, the stale data in the operand latch of the execute stage is replaced with fresh data from a subsequent (i.e. later) stage of the processor pipeline via an existing bypass network, and the pipeline is released from the stall at step 215. Operation then continues normally, using the correct operand values to evaluate the instruction in the execute stage without having to re-read the register file in the register read stage.

This invention has been described with reference to specific exemplary embodiments thereof. It will, however, be evident to persons having the benefit of this disclosure that various modifications and changes may be made to these embodiments without departing from the broader spirit and scope of the invention. The specification and drawings are, accordingly, to be regarded in an illustrative rather than a restrictive sense.

What is claimed is:

1. A method of controlling a processor pipeline comprising:
    detecting a hazard on a register based on an ID of the register from a first latch of a first stage of the pipeline;
    stalling at least a portion of the pipeline after a stale value of the register is stored in a second latch of a later stage of the pipeline; and
    replacing the stale value in the second latch with a fresh value while the pipeline is stalled.

2. The method of claim 1, further comprising forwarding the ID of the register to a third latch of the later stage before stalling the pipeline.

3. The method of claim 2, wherein replacing the stale value comprises using the ID of the register to bypass the fresh value from a subsequent stage of the pipeline into the second latch.

4. The method of claim 3, further comprising writing the fresh value to a register file after stalling the pipeline.

5. The method of claim 4, wherein the first stage is a register read stage of the pipeline.

6. The method of claim 5, wherein the later stage is an execute stage of the pipeline, and the second latch is an operand latch of the execute stage.

7. The method of claim 6, further comprising:
    releasing the pipeline after replacing the stale value; and
    calculating a result using the fresh value as an operand.

8. The method of claim 1, further comprising reading a register file in the first stage of the pipeline using the ID of the register before stalling the pipeline.

9. The method of claim 1, wherein the first stage is a register read stage and the later stage is an execute stage of the pipeline.

10. A processor comprising:
    a first register ID latch of a first stage of a pipeline;
    a second register ID latch of a later stage of the pipeline having an input coupled to an output of the first register ID latch;
    a register hazard detector having a stall signal output in the later stage and having an input coupled to an output of the first register ID latch in the first stage;
    a first multiplexer having an input coupled to an output of the first register ID latch, another input coupled to an output of the second register ID latch, and a control gate coupled to the stall signal output; and
    a comparator having an input coupled to an output of the multiplexer.

11. The processor of claim 10, further comprising a second multiplexer having an input coupled to an output of a register file, another input coupled to a register value bypass network, and a control gate coupled to an output of the comparator.

12. The processor of claim 11, further comprising an operand latch of the later stage of the pipeline coupled to an output of the second multiplexer.

13. The processor of claim 10, wherein the comparator has another input coupled to a register ID bypass network.

14. The processor of claim 12, wherein the comparator has another input coupled to a register ID bypass network.

15. The processor of claim 10, wherein the first stage is a register read stage and the later stage is an execute stage.

16. A processor comprising:
    a first register ID latch of a first stage of a pipeline;
    a second register ID latch of a later stage of the pipeline;
    an operand latch of the later stage;
    a register hazard detector to assert a stall signal; and
    a circuit to provide a stale value to the operand latch before the stall signal is asserted, and to replace the stale value in the operand latch with a fresh value after the stall signal is asserted.

17. The processor of claim 16, further comprising a register file to provide the stale value.

18. The processor of claim 16, further comprising a register value bypass network to provide the stale value.

19. The processor of claim 16, wherein the first stage is a register read stage in which a register file is read using a register ID stored in the first register ID latch, and the later stage is an execute stage.

20. The processor of claim 16, wherein the circuit is to compare a register ID return to a register ID stored in the first register ID latch when the stall signal is deasserted, and to compare a register ID return to a register ID stored in the second register ID latch when the stall signal is asserted.

* * * * *